US011162638B1

(12) United States Patent
Bäumer et al.

(10) Patent No.: US 11,162,638 B1
(45) Date of Patent: Nov. 2, 2021

(54) POLAR CAP-REINFORCED PRESSURE VESSEL

(71) Applicant: Enrichment Technology Company Ltd., Jülich (DE)

(72) Inventors: Thomas Bäumer, Hückelhoven (DE); Christian Middendorf, Aachen (DE)

(73) Assignee: NPROXX B.V., RK Heerlen (DE)

( * ) Notice: Subject to any disclaimer, the term of this patent is extended or adjusted under 35 U.S.C. 154(b) by 238 days.

(21) Appl. No.: 16/076,768

(22) PCT Filed: Jan. 31, 2017

(86) PCT No.: PCT/EP2017/052017
§ 371 (c)(1),
(2) Date: Aug. 9, 2018

(87) PCT Pub. No.: WO2017/137278
PCT Pub. Date: Aug. 17, 2017

(30) Foreign Application Priority Data

Feb. 12, 2016 (DE) ..................... 20 2016 100 754.2

(51) Int. Cl.
*F17C 1/06* (2006.01)

(52) U.S. Cl.
CPC ........ *F17C 1/06* (2013.01); *F17C 2201/0109* (2013.01); *F17C 2203/0604* (2013.01);
(Continued)

(58) Field of Classification Search
CPC ........ F17C 2209/234; F17C 2201/0109; F17C 1/06; F17C 2203/0663; F17C 2203/0619;
(Continued)

(56) References Cited

U.S. PATENT DOCUMENTS 2,744,043 A  5/1956  Ramberg
3,260,398 A  7/1966  Levenetz
(Continued)

FOREIGN PATENT DOCUMENTS

EP   1989477 A1   11/2008
WO   2014139531 A1   9/2014

OTHER PUBLICATIONS

International Preliminary Report on Patentability corresponding to European Application No. PCT/EP2017/052017 dated Aug. 23, 2018.
(Continued)

*Primary Examiner* — Stephen J Castellano
(74) *Attorney, Agent, or Firm* — Tarolli, Sundheim, Covell & Tummino LLP (57) ABSTRACT

The invention relates to a pressure vessel with reinforced pole caps and a method for producing such a pressure vessel, which comprises an inner vessel of a cylinder-shaped central part and two dome-shaped pole caps closing the central part on both sides and an outer layer wound on the inner vessel for the reinforcement of the inner vessel against a pressure load, wherein the outer layer comprises at least one pole cap reinforcement layer and a pressure vessel reinforcement layer of fiber composite material, wherein the pole cap reinforcement layer at least partially covers the pole caps and the pressure vessel reinforcement layer covers the pole caps and the central part and a contour-stable preform is arranged as the pole cap reinforcement layer on at least one of the pole caps, preferably on both pole caps.

15 Claims, 7 Drawing Sheets

(52) U.S. Cl.
CPC ............... *F17C 2203/0619* (2013.01); *F17C 2203/0663* (2013.01); *F17C 2209/234* (2013.01); *F17C 2221/012* (2013.01); *F17C 2221/033* (2013.01); *F17C 2223/0123* (2013.01); *F17C 2223/035* (2013.01); *F17C 2270/0168* (2013.01)

(58) Field of Classification Search
CPC ...... F17C 2203/0604; F17C 2223/0123; F17C 2223/035; F17C 2270/0168; F17C 2221/033
See application file for complete search history.

(56) References Cited

U.S. PATENT DOCUMENTS

| | | | |
|---|---|---|---|
| 3,815,773 A | 6/1974 | Duvall et al. | |
| 2009/0314785 A1* | 12/2009 | Cronin | B65D 90/022 220/590 |
| 2013/0299505 A1* | 11/2013 | Otsubo | B29D 22/003 220/590 |

OTHER PUBLICATIONS

International Search Report for corresponding International Application No. PCT/EP2017/052017, dated Apr. 5, 2017.

* cited by examiner

POLAR CAP-REINFORCED PRESSURE VESSEL

RELATED APPLICATIONS

The present invention is a U.S. National Stage under 35 USC 371 patent application, claiming priority to Serial No. PCT/EP2017/052017, filed on 31 Jan. 2017; which claims priority of DE 20 2016 100 754.2, filed on 12 Feb. 2016, the entirety of both of which are incorporated herein by reference.

FIELD OF THE INVENTION

The invention relates to a pressure vessel with reinforced pole caps and to a method for producing such a pressure vessel.

BACKGROUND OF THE INVENTION

The market for fiber-reinforced pressure vessels of fiber composite material grows continuously. The increasing extraction of natural gas and tracking gas requires a storage in pressure vessels, especially in countries without a corresponding pipeline network. In addition, there is the automobile sector, which is highly involved in the development of fuel cell vehicles, in which the fuel is to be stored in the form of gaseous hydrogen under high pressure in pressure vessels. Light pressure vessels are desired for the transport of the pressure vessels, because a transport of pressure vessels with high vessel weights consumes an unnecessarily large amount of energy and therefore causes excessively high transport costs.

Currently used pressure vessels have a cylindrical central part, on which pole caps for the closure of the central part are located on both sides and which are produced, for example, using a fiber winding method. A liner (inside vessel for the pressure vessel) is used here, which acts as a winding core on the one hand and also guarantees the impermeability of the vessel on the other hand. For the production of the pressure vessel, this liner is then over-wound for reinforcement with fiber composite material, so that the resulting pressure vessel maintains its stability. Type 3 pressure vessels use a metallic liner of aluminum or steel, whereas Type 4 pressure vessels use a plastic liner.

There is the so-called overbraiding method competing with the winding method, in which dry or pre-impregnated fibers (mostly carbon fibers) are braided onto the liner. The liner is thereby braided back and forth until the required fiber reinforcement is achieved. In the two described production methods, the laminated structure differs significantly. In the overbraiding process, the variation possibilities with regard to the fiber angle are much more limited, because the number of braiding bobbins and the thickness of the fiber used result in a certain fiber angle, which can only be varied within small limits. The disadvantages of the overbraiding process are fiber corrugation and different laminate quality depending on fiber deposition direction, in particular the difference, whether the braiding occurs from a small diameter to a large diameter or vice versa. Fiber corrugation refers to the redirection of fibers within tissues, for example, in the case of fiber composite composites, where fiber bundles are woven and held together by a warp thread, respectively chaining thread. This can lead to a deviation of the fiber bundles caused by the warp threads, which leads to a decrease in the fiber-parallel strength of the tissue.

In the winding method, a distinction is made between circumferential winding and axial winding. The circumferential windings have a fiber deposition angle of 80-90° to the vessel axis, the axial layers have an angle of 10-70° to the axis. Theoretically, all winders can be implemented between 0 and 90° in the cylindrical part of the pressure vessel, however, this makes practically no sense because the tension conditions dictate a special laminate structure. The laminate structure of the wound pressure vessel reveals the drawback that in the pole cap area the reinforcement in the peripheral direction is not possible, because the thread, that is wound in the peripheral direction, slides off and only comes to a stop at the liner clamping. This missing peripheral reinforcement must be compensated for by corresponding axial windings, because otherwise the vessel will fail prematurely in the pole cap area. The disadvantage is that the necessary axial windings are partly only necessary for the pole cap area and are redundant in the cylindrical area of the pressure vessel. As a result, especially in the case of long vessels, an unnecessarily large amount of fiber is processed, which increases the costs and weight of the vessel.

It would therefore be desirable if pressure vessels were available, which can be manufactured with little material expenditure and have the lowest possible weight.

SUMMARY OF THE INVENTION

It is therefore an object of the invention to provide a pressure vessel, that can be produced more cost-effectively while maintaining the same strength properties.

This object is achieved by a pressure vessel comprising an inner vessel of a cylinder-shaped central part and two dome-shaped pole caps in each case closing the central part on both sides and an outer layer wound on the inner vessel for the reinforcement of the inner vessel against a pressure load, wherein the outer layer comprises at least one pole cap reinforcement layer and a pressure vessel reinforcement layer of fiber composite material, wherein the pole cap reinforcement layer at least partially covers the pole caps and the pressure vessel reinforcement layer covers the pole caps and the central part.

The cylinder-shaped pressure vessels comprise a cylindrical part, here referred to as the central part, which has a circular cross-sectional surface perpendicular to the cylinder axis. So that gas can be stored under pressure in this pressure vessel, the cylinder surfaces of the central part are closed with dome-shaped lid surfaces. These geometric considerations apply equally to pressure vessels of an inner vessel and an outer layer wound over the inner vessel to reinforce the inner vessel, for example, with an inner vessel of plastic. On the one hand, such vessels have a very low weight, which, for example, is important for applications in transport means, and on the other hand gases, such as, for example, hydrogen, can be stored under high pressure with low loss, since plastic has very low hydrogen permeability and the required strength is provided by the outer layer of fiber composite material. The pressure vessel according to the invention thus comprises an inner vessel with dome-like lid surfaces, preferably having a shape deviating from a hemisphere, which has a stronger curvature in the lid marginal area adjacent to the cylindrical central part of the inner vessel compared to that of a hemisphere surface, while the central area of the lid surface has a smaller curvature compared to that of a hemisphere surface. Such a particularly suitable dome-shaped lid surface is also referred to as isotensoid. An isotensoid thereby refers to a form, which in an outer layer of a fiber composite material wound on top of it, produces a constant tension in the fibers at all points of the fiber path. The term "cover" refers to the applying of the pole cap reinforcement layer and the pressure vessel reinforcement layer to the inner vessel from the outside.

In this case, the fiber composite material generally consists of two main components, in this case fibers, embedded in a matrix material that produces the solid bond between the fibers. The fiber composite material can thereby be wound and/or braided from one or more fibers, wherein the fiber(s) is/are wound tightly in contact with each other and/or is/are interwoven. This creates a fiber layer on which the fibers are wound and/or braided in further fiber layers, until the fiber composite material has the desired thickness and constitutes a corresponding outer layer with this thickness. In one embodiment, the outer layer comprises first and further fibers, for example, second fibers, in multiple fiber layers. The composite gives the fiber composite material higher-quality properties, such as, for example, high strength than either of the two individual components involved could provide. The reinforcement effect of the fibers in the fiber direction occurs when the elasticity modulus of the fiber is greater in the longitudinal direction than the elasticity modulus of the matrix material, when the elongation at break of the matrix material is greater than the elongation at break of the fibers and when the break strength of the fibers is greater than the break strength of the matrix material. Fibers of all kinds can be used, such as, for example, glass fibers, carbon fibers, ceramic fibers, steel fibers, natural fibers or synthetic fibers. Duromers, elastomers or thermoplastics can be used as matrix materials, for example. The material properties of the fibers and matrix materials are known to the person skilled in the art, so that the person skilled in the art can select a suitable combination of fibers and matrix materials for the production of the fiber composite material for the respective use. In this case, individual fiber layers in the fiber composite area can comprise a single fiber or several identical or different fibers.

Due to the fact that only the pole caps comprise a pole cap reinforcement layer, which, however, does not extend over the central part and that the strength of the pressure vessel in the central part can be achieved solely by the pressure vessel reinforcement layer, which is formed by means of a fiber composite layer optimized for the geometry of the cylindrical central part (fiber layers in circumferential direction and axial direction at a ratio of 2:1), the wrapping of the central part with a fiber composite layer optimized for the geometry of the pole caps (additionally axially aligned fiber layers) is avoided.

The pressure vessel according to the invention thus requires less fiber composite material for producing the outer layer as a wrapping of the inner vessel, in order to nevertheless have the same strength as other pressure vessels. The pressure vessel according to the invention can thus be produced more cost-effectively with the same strength properties.

These advantages can be achieved, for example, by means of a winding technology and the use of a so-called preform, which is placed over the pole caps.

In this case, a contour-stable preform is arranged as pole cap reinforcement layer on at least one of the pole caps, preferably on both pole caps. The preform is a textile fiber preform blank that is applied to the pole caps before or during the winding of the pressure vessel reinforcement layer and reinforces these in circumferential direction. The preform can thereby be produced by means of braiding methods or by means of a so-called "fiber placement method" and applied to the pole cap. The term "contour-stable" here refers to the preform having sufficient intrinsic stiffness, so that it is not displaced or compressed during later overwinding.

In one embodiment, the contour-stable preform is a contour-stable preform which is braided from fiber material and has a braiding angle of the fiber material at the pole cap margin of at least 140°, preferably at least 150°, particularly preferably at least 160°. The braiding angle is the angle between the intersecting, respectively crossing fibers whose angle bisector is essentially parallel to the cylinder axis of the cylindrical central part. The term "in essence" refers to maximum deviations of ±5° from the stated value. The term "meshwork" (a braided preform is a preform of fibers or fiber meshwork intersecting with a braiding angle) thereby refers to the product from the interlocking of at least two fibers of flexible material in order to form a ply of meshwork. However, the preform as a total meshwork can also comprise several such plies of meshwork. Therefore, a meshwork cannot be made from a single thread alone and thus forms the opposite of a wound body. In a ply of meshwork, the fibers (or threads) intersect at a braiding angle,
wherein fibers (threads) running adjacent to each other alternately underflow and overflow the crossing fibers (threads) and the respectively neighboring thread performs the underflowing and the overflowing in the opposite direction. The meshwork of fiber material can be produced with different tightness, so that between the individual fibers there can be a volume varying in number and size, which, for example, can be subsequently filled by matrix material. In one embodiment, the meshwork comprises multiple layers of fibers intersecting in a braiding angle.

In one embodiment, one or more reinforcement threads, with an orientation essentially parallel to the cylinder axis of the cylindrical central part, are braided into the braided preform. The reinforcement threads are advantageous for the bend load capacity in the pole cap area. When braiding the preform, so-called 0° standing threads can be easily drawn in as reinforcement threads, wherein the 0° angle corresponds to an orientation parallel to the cylinder axis. The term "essentially" refers to maximum deviations of ±5° from the stated value. If a braiding machine arrangement is selected, which results in a braiding angle in the marginal area of the pole cap of approximately 160°, then a nearly optimal fiber composite material in a ratio of 2:1 (radial: axial) is produced with the 0° standing threads, which corresponds to the stress according to the boiler formula. The braiding angle varies in the pole cap area in a direction of the pole cap center, according to the distance relative to the cylinder axis, which, however, is unproblematic in the event of a decreasing tension. The pole cap reinforcement layer constructed in this way avoids the fiber corrugation and different laminate quality depending on a fiber deposition direction (difference between braiding from a small diameter to a large diameter or vice versa). For example, carbon threads can be used as reinforcement threads.

In one embodiment, the contour-stable preform consists of fiber material stitched onto a drapeable support material, preferably the support material is a mat. The term "drapeable" refers to the ability to adapt to a spatial shape. By stitching, the fiber material is fixed in its desired orientation. In an embodiment, the fiber material is stitched spirally onto the support material.

In a further embodiment, one or more reinforcement threads, with an orientation essentially parallel to the cylinder axis of the cylindrical central part, are stitched onto the support material. The same applies to this reinforcement threads as already described above for the reinforcement threads in the braided preform. For example, the reinforcement threads are likewise stitched and reinforce the pole cap in the axial direction (parallel to the cylinder axis)

In a further embodiment, the support material is attached directly to the pole cap with an adhesive layer. The adhesive layer, for example a layer of epoxy resin applied as spraycoat layer onto the carrier layer, adheres the carrier layer with stitched-on fiber material firmly to the pole cap after being slid onto the pole cap and thus prevents a slipping during the subsequent production steps.

In a further embodiment, the preform is slid over at least a part of the still wet fiber composite material, which is wound over the pole cap, of the pressure vessel reinforcement layer and is fixed in the area of the pole cap by the matrix material of the pressure vessel reinforcement layer. The term "wet" refers to a fiber composite material that has not yet cured, where the matrix material can still cross-link with the material applied from the outside. In this case, sufficient matrix material, for example resin, must be located on the pressure vessel reinforcement layer, so that the per se dry preform can be immersed with sufficient matrix material for the contour stability and cross-linking of the preform. Preferably, the preform is already immersed or impregnated with a thermoset matrix material. In this embodiment, the pole cap reinforcement layer is incorporated into the pressure vessel reinforcement layer as common composite.

In a further embodiment, the pressure vessel reinforcement layer covers the pole cap reinforcement layer and the preform is fixed onto the pole cap in order to produce the contour stability. As a result, an adhesive layer additionally to be applied can be dispensed with in the preform. In one embodiment, the preform is produced with a thermoplastic matrix and is heat-sealed at least punctually with the pole cap of a plastic material (for example, of a thermoplastic material). A thermoplastic matrix material enables the heat-sealing with plastic material.

In a further embodiment, the preform is a cured preform, wherein an inner contour of the preform is adjusted to the pole cap and an outer contour of the preform is designed in such a way that the pressure vessel reinforcement layer can be deposited thereon, wherein the outer contour is designed in such a way here that it constitutes an extension of the central part of the inner vessel in the marginal area of the pole cap, wherein the pressure vessel reinforcement layer further comprises a radially wound inner layer, which is wound as a contiguous layer onto the central part and directly onto the outer contour in the marginal area for the subsequent overwinding with further outer layers of the pressure vessel reinforcement layer, preferably the preform comprises a stop nose as boundary of the outer contour, overwound with the pressure vessel reinforcement layer, in the marginal area of the pole cap. Radial windings refer to the fiber angle in the pressure vessel reinforcement layer with a fiber direction in the fiber composite material of close to 90° relative to the cylinder axis of the central part of the pressure vessel.

The pressure vessels according to the invention can be used, for example, as CNG pressure vessels, hydrogen pressure vessels, breathing air bottles and other pressure vessels.

The pressure vessel according to the invention, comprising an inner vessel of a cylinder-shaped central part and two dome-shaped pole caps closing the central part on both sides in each case, can be produced, for example, in such a way that an outer layer is wound onto the pole caps and the inner vessel for the reinforcement of the inner vessel against a pressure load, wherein the outer layer comprises at least a pole cap reinforcement layer and a pressure vessel reinforcement layer of fiber composite material, in that the pole cape reinforcement layer is applied onto the pole caps in such a way that it covers these at least partially and the pressure vessel reinforcement layer is applied to the pole caps and the central part, wherein preferably the pressure vessel reinforcement layer is applied onto the pole cap reinforcement layer from the outside.

In this case, a contour-stable preform will be arranged as pole cap reinforcement layer on at least one of the pole caps, preferably on both pole caps. The preform is a textile fiber preform blank that is applied to the pole caps before or during the winding of the pressure vessel reinforcement layer and reinforces these in circumferential direction. The preform can thereby be produced by means of braiding methods or by means of a so-called "fiber placement method" and applied to the pole cap.

In one embodiment, a contour-stable preform is braided as pole cap reinforcement layer from a fiber material F1, wherein the braiding angle FLW of the preform at the pole cap margin is at least 140°, preferably at least 150°, particularly preferably at least 160°. In an additional step, one or more reinforcement threads, with an orientation essentially parallel to the cylinder axis of the cylindrical central part, can thereby be braided in.

In an alternative embodiment, fiber material can be stitched onto a drapeable support material, preferably a mat, for the production of the contour-stable preform (a so-called tailored fiber placement TFP). In this case, the fiber material can be stitched spirally onto the support material. Furthermore, one or more reinforcement threads, with an orientation essentially parallel to the cylinder axis of the cylindrical central part, can be stitched onto the support material. The TFP method also offers the possibility to combine different fibers such as carbon fibers, glass fibers, or Kevlar fibers with one another in such a way that, for example, the energy absorption in the pole cap area is increased, as is required, for example, in the event of a vessel colliding with a solid surface. The support material can be attached with an adhesive layer directly onto the pole cap. Alternatively to the adhesive bonding, the preform can also be slid over at least a part of the still wet fiber composite material of the pressure vessel reinforcement layer and can be fixed in the area of the pole cap by the matrix material of the pressure vessel reinforcement layer. Alternatively, the pressure vessel reinforcement layer can be applied onto the pole cap reinforcement layer in a covering manner, wherein the preform is fixed on the pole cap in advance in order to produce the contour stability. For this purpose, the preform can be produced with a thermoplastic matrix and be heat-sealed at least punctually with the pole cap of a plastic material.

Alternatively, the TFP or braiding preform can be impregnated and cured in a subsequent process, for example by means of a so-called resin transfer molding (RTM), in a mold with a thermosetting resin, before the pole cap reinforcement layer produced in this way is applied onto the pole cap area of the liner (inner vessel for the pressure vessel). The shape is thereby designed in such a way that the inner contour of the pole cap reinforcement layer corresponds to the one of the pole cap of the liner (inner vessel for the pressure vessel) and the outer contour constitutes a surface suitable for laying down the axial windings in accordance with the load.

In a further embodiment, the outer contour of the pole cap reinforcement layer can be designed in such a way, as to have the cylindrical area of the central part of the pressure vessel initially continued therein in a marginal area of the pole cap as an extended area, and in this way to allow for facilitated deposition, drawn into the pole cap area, of the inner plies of the pressure vessel reinforcement layer in the form of radial windings.

In a further embodiment, this preform can be connected to the pressure port in a form-fitting manner. As a result, together with the pressure vessel reinforcement layer, which is wound thereover and, after the curing, makes a connection with the preform, a high torque from the pressure port can be induced into the laminate, without straining the connection from the pressure port to the inner vessel.

BRIEF DESCRIPTION OF THE FIGURES

These and other aspects of the invention are shown in detail in the figures as follows.

DETAILED DESCRIPTION OF THE EXEMPLARY EMBODIMENTS

Figure 1:
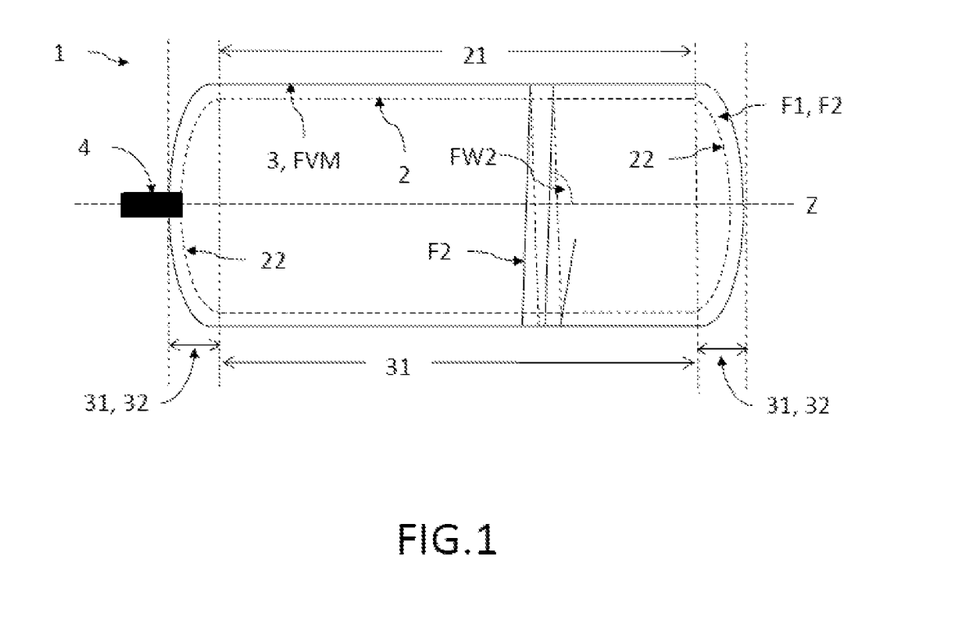
FIG. 1: an embodiment of a pressure vessel according to the invention in a lateral section.

FIG. 1 shows an embodiment of a pressure vessel 1 according to the invention in the lateral section. This pressure vessel 1 comprises an inner vessel 2 of a cylinder-shaped central part 21 and two dome-shaped pole caps 22 respectively closing the central part 21 on both sides and an outer layer 3 wound on the inner vessel 2 for the reinforcement of the inner vessel 2 against a pressure load, wherein the outer layer 3 comprises at least one pole cap reinforcement layer 31 and a pressure vessel reinforcement layer 32 of fiber composite material (FVM for short), wherein the pole cap reinforcement layer 31 at least partially covers the pole caps 22 and the pressure vessel reinforcement layer 32 covers the pole caps 22 and the central part 21. The fiber angle FW2 is thereby an angle of close to 90° to the cylinder axis Z of the central part, preferably FW2 amounts to more than 80°.

Figure 2:
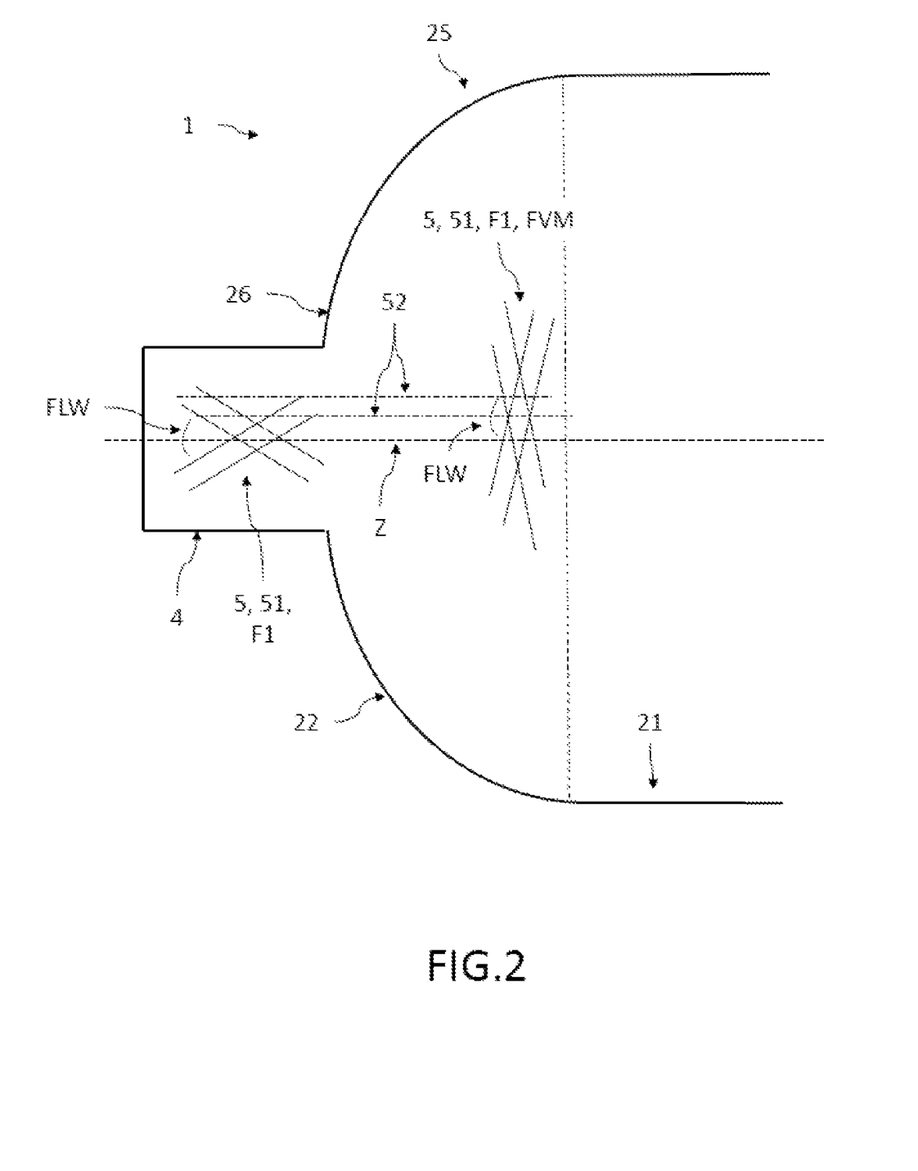
FIG. 2: an embodiment of a pressure vessel according to the invention in the region of the pole cap in the lateral section with a preform of braided fiber composite material.

FIG. 2 shows an embodiment of a pressure vessel 1 according to the invention in the region of the pole cap 22 in the lateral section with a preform 5 of braided fiber composite material FVM. This contour-stable preform 5 is arranged as pole cap reinforcement layer 31 on at least one of the pole caps 22, preferably on both pole caps 22. In this case, the preform 5 is designed as a contour-stable preform 51, which is braided from fiber material F1, with a braiding angle FLW of the fiber material F1 at the pole cap margin 25 of at least 140°, preferably at least 150°, particularly preferably at least 160°. Towards the pole cap center 26 the braiding angle FLW is reduced significantly. In this embodiment, more reinforcement threads 52 are braided into the braided preform 51, with an orientation essentially parallel to the cylinder axis Z of the cylindrical central part 21, wherein for the sake of clarity only two reinforcement threads are shown. The same applies to the intersecting fibers, where also only a few fibers are illustrated representative for the remaining fibers.

Figure 3:
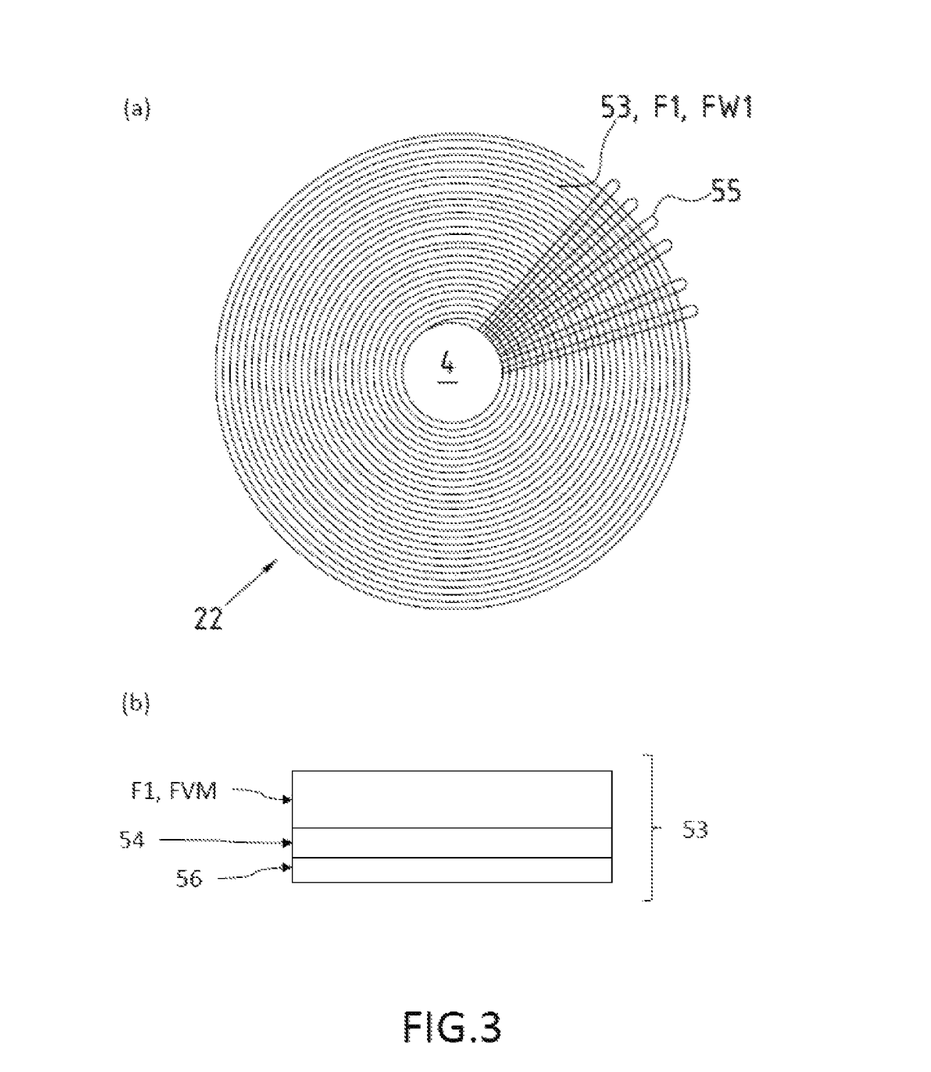
FIG. 3: an embodiment of a pressure vessel according to the invention in the region of the pole cap with a preform of fiber material stitched onto a support material (a) in a top view of the pole cap and (b) in the lateral section through the preform.
Figure 4:
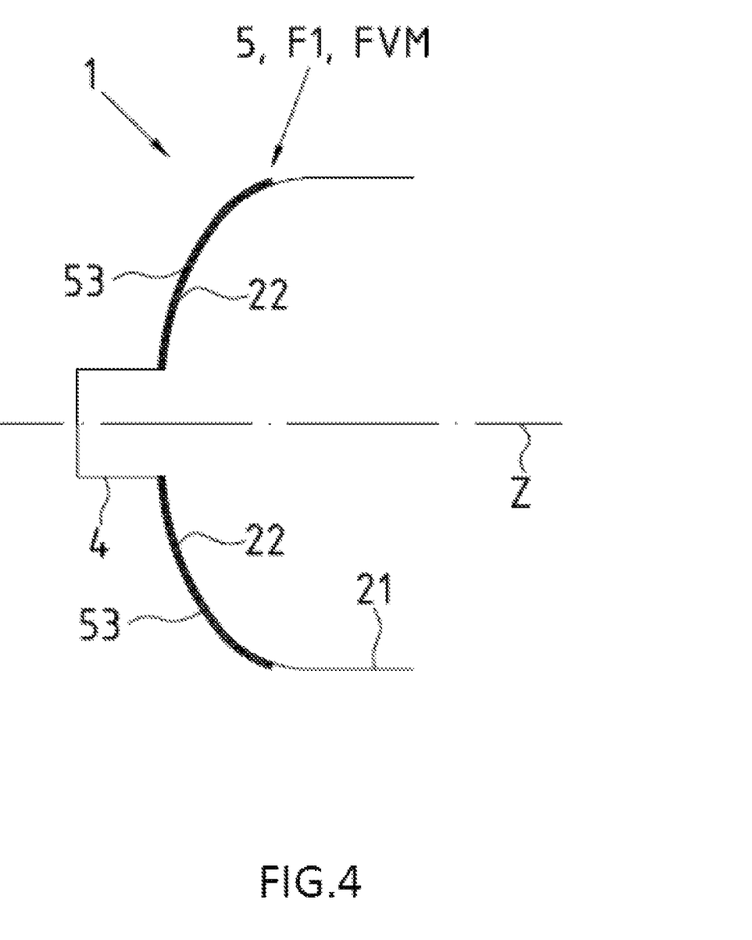
FIG. 4: an embodiment of a pressure vessel according to the invention in the region of the pole cap in the lateral section with a preform of fiber material stitched onto a support material, which is draped onto the pole cap.

FIG. 3 shows an embodiment of a pressure vessel 1 according to the invention in the region of the pole cap 22 with a preform 53 of fiber material F1 stitched onto a support material 54 (a) in a top view of the pole cap and (b) in the lateral section through the preform. The shown preform 53 is arranged as pole cap reinforcement layer 31 on at least one of the pole caps 22, preferably on both pole caps 22. In this case, the fiber material F1 can be stitched spirally onto the support material 54. In this embodiment one or more reinforcement threads 55, with an orientation essentially in parallel to the cylinder axis Z of the cylindrical central part 21, can be stitched onto the support material 54. As shown in FIG. 4b, the preform 53 comprises an adhesive layer 56 in addition to the fiber composite material F1, FVM and the carrier layer 54. The support material 54 is attached with an adhesive layer 56 directly onto the pole cap. In this case, the reinforcement threads 55 can slide and thus enable the reshaping to the pole cap contour.

FIG. 4 shows an embodiment of a pressure vessel 1 according to the invention in the region of the pole cap 22 in the lateral section with a preform 53 of fiber material FVM stitched onto a support material 54, which is draped onto the pole cap 22.

The pole cap reinforcement layers 5, 51 and 53 of FIGS. 2-4 can be slid over at least a part of the still wet fiber composite material F2, which is wound over the pole cap 22, of the pressure vessel reinforcement layer 32 and can be fixed in the region of the pole cap 22 by the matrix material of the pressure vessel reinforcement layer 32. For this purpose, the pole cap reinforcement layers 5, 51 and 53 comprise a thermosetting material as matrix material, so that a good cross-linking with the pressure vessel reinforcement layer 32 can be produced.

Insofar as, on the other hand, the pole cap reinforcement layers 5, 51 and 53 are to be covered by the pressure vessel reinforcement layer 32 and the pole cap reinforcement layers 5, 51 and 53 for production of the contour stability are to be fixed on the pole cap 22, the pole cap reinforcement layers 5, 51 and 53 comprise a thermoplastic material as matrix material, in order to allow for the production of good heat-sealing to the pole cap, preferably produced per se of a thermoplastic material.

Figure 5:
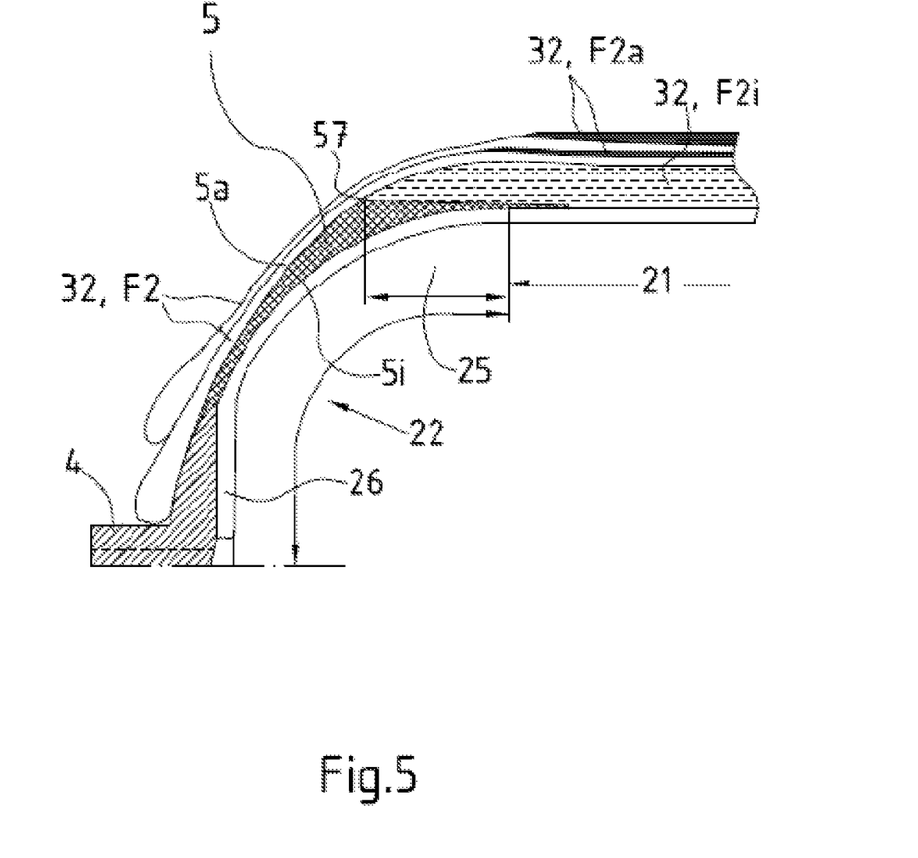
FIG. 5: an embodiment of a pressure vessel according to the invention in the region of the pole cap in a lateral section with a preform.

FIG. 5 shows a further embodiment of the pressure vessel 1 with the preform 5 as an insertion component for the pole cap 22. The TFP or meshwork preform 5 was impregnated and cured in a subsequent process, for example by means of a so-called resin transfer molding (RTM), in a mold with a duroplastic resin, before this is applied as pole cap reinforcement layer 31 onto the pole cap area 22 of the inner vessel 2. The shape of the pole cap reinforcement layer 31 provided this way is thereby designed in such a way that the inner contour 5i of the preform 5 corresponds to that of the pole cap 22 and the outer contour 5a constitutes a surface suitable for deposition of the axial fiber windings F2 of the pressure vessel reinforcement layer 32 in accordance with the load. In this case, the outer contour 5a can be designed in such a way that in it the central part 21 of the inner vessel 2 is initially continued in a marginal area 25 of the pole cap 22 as an extended area, and therefore a deposition of the inner layers F2i of the pressure vessel reinforcement layer 32 (windings in the circumferential direction) in the form of radial windings, drawn into the pole cap area, is facilitated as far as up to the stop nose 57. In this case, this preform 5 can be positively to the pressure connection 4 in a form-fit manner. As a result, together with the pressure vessel reinforcement layer 32, which is wound thereover and, after the curing, makes a connection with the preform 5, a high torque from the pressure connection 4 can be induced into the laminate, without straining the connection from the pressure connection 4 to the inner vessel 2.

Figure 6:
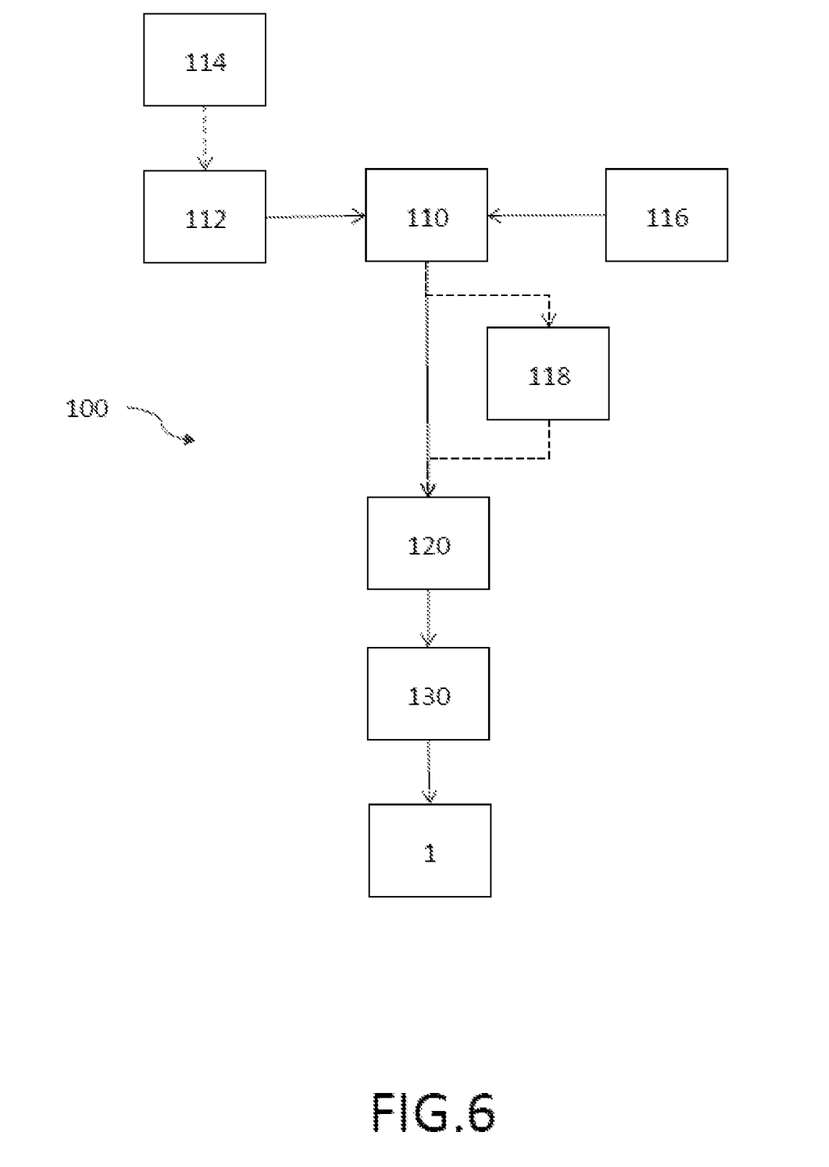
FIG. 6: an embodiment of a method according to the invention for the production of the pressure vessel according to the invention.

FIG. 6 shows an embodiment of a method 100 according to the invention for producing the pressure vessel shown in FIG. 1 comprising the steps of producing 110 a contour-stable preform 5, 51, 53 as the pole cap reinforcement layer 31 for at least one of the pole caps 22, preferably for both pole caps 22, by means of a braiding method 112 or by means of stitching 116 of fiber material onto a drapeable support material 54; the application 120 of the pole cap reinforcement layer 31 to the pole caps 22, such that the pole cap reinforcement layer 31 at least partially covers the pole caps 22; and the application 130 of the pressure vessel reinforcement layer 32 to the pole caps 22 and the central part 21, wherein preferably the pressure vessel reinforcement layer 32 is applied to the pole cap reinforcement layer 22 from the outside.

Figure 7:
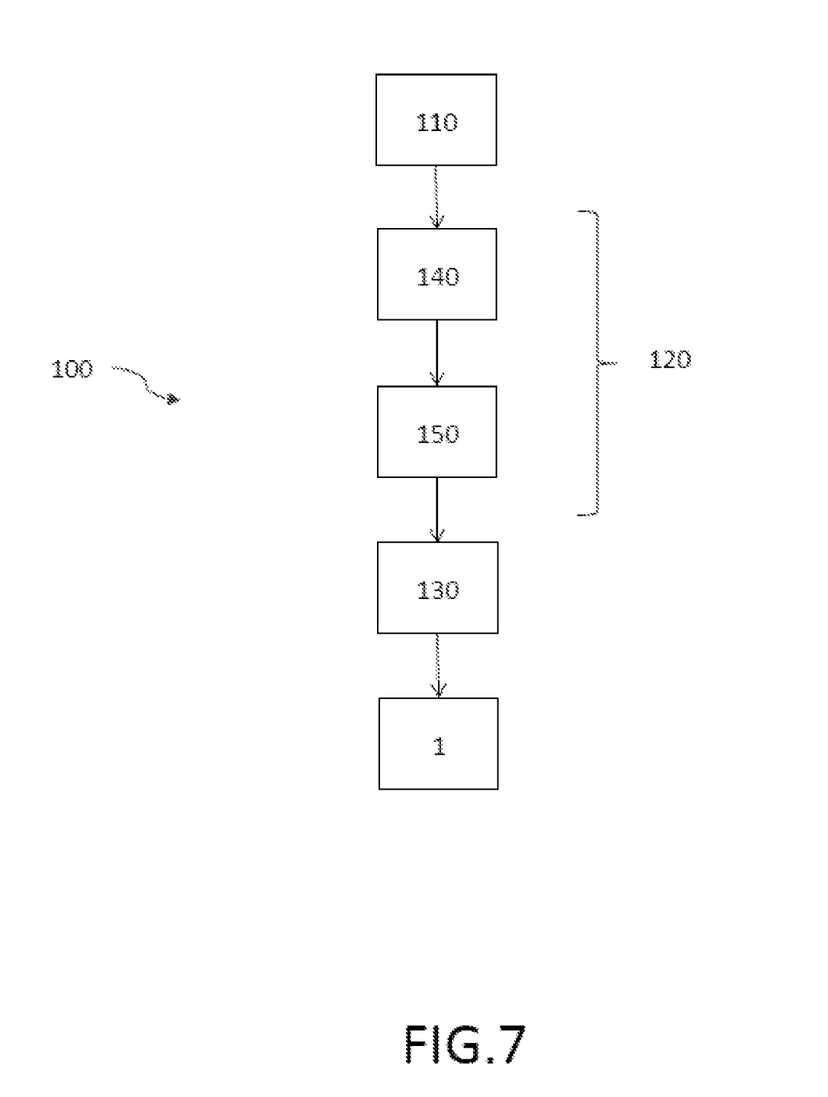
FIG. 7: a further embodiment of a method according to the invention for the production of the pressure vessel according to the invention.

FIG. 7 shows a further embodiment of a method 100 according to the invention for producing the pressure vessel shown in FIG. 1, for the production 110 of a contour-stable preform 5 and for the application 120 of the pole cap reinforcement layer the steps of curing 140 of the preform 5 with an inner contour 5i adapted to the pole cap 22 and an outer contour 5a, which is designed in such a way that the pressure vessel reinforcement layer 32 can be deposited thereon, wherein the outer contour 5a is thereby designed in such a way that it constitutes an extension of the central part 21 of the inner vessel 2 in the marginal area 25 of the pole cap 22; as well as the winding 150 of an inner layer F2i as a radial winding of the pressure vessel reinforcement layer 32 onto the central part 21 and directly onto the outer contour 5a in the marginal area 25, preferably up to a stop nose 57 of the preform 5 as a boundary of the outer contour 5a to be overwound with the pressure vessel reinforcement layer 22 in the marginal area 25 of the pole cap 22; followed by a winding up 130 of one or more outer layers F2a of the pressure vessel reinforcement layer 32 onto the entire preform 5.

The embodiments shown here are only examples of the present invention and should therefore not be understood as limiting. Alternative embodiments, which are considered by the person skilled in the art, are equally encompassed by the scope of the present invention.

LIST OF REFERENCE CHARACTERS

1 Pressure vessel
2 Inner vessel
21 Cylindrical central part of the inner vessel
22 Dome-shaped pole caps of the inner vessel
25 Marginal area of the pole cap or extended area
26 Pole cap center
3 Outer layer from fiber composite material
31 Pole cap reinforcement layer of the outer layer
32 Pressure vessel reinforcement layer of the outer layer
4 Valve/Pressure port
5 Contour-stable preform as pole cap reinforcement layer
5a Outer contour of the preform
5i Inner contour of the preform
51 Contour-stable preform braided from fiber material
52 Reinforcement threads for meshwork
53 Contour-stable preform from fiber material stitched onto a support material
54 support material
55 Reinforcement threads for preform
56 Adhesive layer
57 Connection nose for the pressure vessel reinforcement layer
100 Pressure vessel according to the invention
110 Production of a contour-stable preform
112 The production by means of a braid method
114 Additional braiding of one or more reinforcement threads
116 The production by means of stitching
118 Punctual heat-sealing of the preform with the pole cap
120 Application of the pole cap reinforcement layer onto the pole caps
130 Application of the pressure vessel reinforcement layer onto the pole caps
140 Curing of the preform with an inner contour adjusted to the pole cap
150 Winding up of an inner layer of the pressure vessel reinforcement layer directly onto the outer contour of the preform in the marginal area
F1 Fiber or fiber material of the pole cap reinforcement layer
F2 Fiber or fiber material of the pressure vessel reinforcement layer
F2i Inner layers of the pressure vessel reinforcement layer
F2a Outer layers of the pressure vessel reinforcement layer
FW1 Fiber angle in the pole cap reinforcement layer
FLW Braiding angle in the pole cap reinforcement layer
FW2 Fiber angle in the pressure vessel reinforcement layer
FVM Fiber composite material of the outer layer, of the pole cap reinforcement layer and/or the pressure vessel reinforcement layer
Z Cylinder axis of the cylindrical central part

The invention claimed is:

1. A pressure vessel comprising:
an inner vessel from a cylinder-shaped central part and two dome-shaped pole caps respectively closing the central part on both sides and an outer layer wound on the inner vessel for the reinforcement of the inner vessel against a pressure load, wherein the outer layer comprises at least one pole cap reinforcement layer and a pressure vessel reinforcement layer of fiber composite material, wherein the pole cap reinforcement layer at least partially covers the pole caps and the pressure vessel reinforcement layer covers the pole caps and the central part and a contour-stable preform is arranged as the pole cap reinforcement layer on at least one of the pole caps, wherein the contour-stable preform is braided from fiber material with a braiding angle of the fiber material at the pole cap margin of at least 140°, wherein the braiding angle is reduced significantly towards the pole cap center, wherein one or more reinforcement threads, with an orientation substantially parallel to the cylinder axis of the cylindrical central part are braided into the contour-stable preform.

2. The pressure vessel according to claim 1,
wherein the contour-stable preform consists of fiber material, stitched onto a drapeable support material, the fiber material is stitched spirally onto the support material.

3. The pressure vessel according to claim 2,
wherein one or more reinforcement threads, with an orientation essentially parallel to the cylinder axis of the cylindrical central part are stitched onto the support material.

4. The pressure vessel according to claim 2,
wherein the support material is attached with an adhesive layer directly onto the pole cap.

5. The pressure vessel according to claim 1, wherein the pressure vessel reinforcement layer features a matrix material and the contour-stable preform is slid over at least a part of the fiber composite material, the fiber composite material being wet at this stage and which is wound over the pole cap of the pressure vessel reinforcement layer and is fixed in the area of the pole cap by the matrix material of the pressure vessel reinforcement layer.

6. The pressure vessel according to claim 1, wherein the pressure vessel reinforcement layer covers the pole cap reinforcement layer and the contour-stable preform is fixed onto the pole cap for the establishing of the contour stability.

7. The pressure vessel according to claim 6, wherein the contour-stable preform is produced with a thermoplastic matrix and is heat-sealed at least punctually with the pole cap of a plastic material.

8. The pressure vessel according to claim 1, wherein the contour-stable preform is a cured preform for deposition onto the pole cap, wherein an inner contour of the contour-stable preform is adapted to the pole cap and an outer contour of the contour-stable preform is designed in such a way that the pressure vessel reinforcement layer can be deposited thereon, wherein the outer contour is designed in such a way here, that it constitutes an extension of the central part of the inner vessel in the marginal area of the pole cap, wherein the pressure vessel reinforcement layer further comprises a radially wound inner layer, which is wound as a continuous layer onto the central part and directly onto the outer contour in the marginal area for the subsequent overwinding of the entire preform with one or more outer layers of the pressure vessel reinforcement layer.

9. The pressure vessel according to claim 8, wherein the contour-stable preform comprises a stop nose as a boundary of the outer contour, which is overwound with the pressure vessel reinforcement layer in the marginal area of the pole cap.

10. A method for the production of a pressure vessel according to claim 1, comprising an inner vessel of a cylinder-shaped central part, two dome-shaped pole caps closing the central part on both sides in each case, and an outer layer wound on the pole caps and on the inner vessel for the reinforcement the inner vessel against a pressure load, wherein the outer layer comprises at least one pole cap reinforcement layer and one pressure vessel reinforcement layer of fiber composite material, comprising the steps of
producing a contour-stable preform as the pole cap reinforcement layer for at least one of the pole caps by means of a braiding method or by means of stitching of fiber material onto a drapeable support material;
application of the pole cap reinforcement layer on the pole caps, so that the pole cap reinforcement layer at least partially covers the pole caps
application of the pressure vessel reinforcement layer onto the pole caps and the central part, wherein the pressure vessel reinforcement layer is applied onto the pole cap reinforcement layer from the outside.

11. The method according to claim 10, wherein the step of production of the contour-stable preform comprises a braiding of the contour-stable preform from a fiber material with a braiding angle of the preform at a marginal area of the pole cap of at least 140°.

12. The method according to claim 11, wherein the braiding comprises the further step of the additional braiding of one or more reinforcement threads, with an orientation essentially parallel to the cylinder axis of the cylindrical central part.

13. The method according to claim 10, wherein the step of production of the contour-stable preform by means of stitching comprises a spiral-type stitching of the fiber material onto the support material, and wherein one or more reinforcement threads with an orientation essentially parallel to the cylinder axis of the cylindrical central part are stitched onto the support material.

14. The method according to claim 10, comprising the additional step of at least punctual heat-sealing the preform, produced with a thermoplastic matrix to the pole cap, for the fixation of the preform to the pole cap.

15. The method according to claim 10, comprising the additional steps of:
curing of the preform with an inner contour adapted to the pole cap and an outer contour, which is designed in such a way that the pressure vessel reinforcement layer can be deposited thereon, wherein the outer contour is designed in such a way that it constitutes an extension of the central part of the inner vessel in the marginal area of the pole cap
winding up of an inner layer as a radial winding of the pressure vessel reinforcement layer onto the central part and directly onto the outer contour in the marginal area up to a stop nose of the preform as a boundary of the outer contour to be overwound with the pressure vessel reinforcement layer in the marginal area of the pole cap;
subsequent winding up of one or more outer layers of the pressure vessel reinforcement layer onto the entire preform.

* * * * *